US006563238B1

(12) United States Patent
Lee et al.

(10) Patent No.: US 6,563,238 B1
(45) Date of Patent: May 13, 2003

(54) COMB STRUCTURE USING MAGNETIC FORCE AND ACTUATOR AND INERTIA SENSOR BOTH USING THE COMB STRUCTURE

(75) Inventors: Ki Bang Lee, Seoul (KR); Jae-Joon Choi, Kyungki-do (KR); Hee-Moon Jeong, Seoul (KR)

(73) Assignee: Samsung Elctronics Co., Ltd. (KR)

( * ) Notice: Subject to any disclaimer, the term of this patent is extended or adjusted under 35 U.S.C. 154(b) by 0 days.

(21) Appl. No.: 09/453,034

(22) Filed: Dec. 2, 1999

(30) Foreign Application Priority Data

Dec. 4, 1998 (KR) ........................................ 1998-53113

(51) Int. Cl.[7] .............................................. H02K 33/00
(52) U.S. Cl. ........................................................ 310/15
(58) Field of Search ............................ 310/40 MM, 15, 310/17, 23, 24, 30, 29, 28; 73/514.31

(56) References Cited

U.S. PATENT DOCUMENTS

| 4,901,017 A | * | 2/1990 | Zinke ........................ 324/239 |
| 5,025,346 A | * | 6/1991 | Tang et al. .............. 361/283.1 |
| 5,394,131 A | * | 2/1995 | Lungu ........................ 335/229 |
| 6,054,335 A | * | 4/2000 | Sun et al. ..................... 438/23 |

FOREIGN PATENT DOCUMENTS

| DE | 4025452 A1 | 2/1991 |

OTHER PUBLICATIONS

Chong H. Ahn, MArk G. Allen; A Fully Integrated Surface Micromachined Magnetic Microactuator with a Multilevel Meander Magnetic Core; © Mar. 1993; Jornal of Microelectromechanical Systems, vol. 2, No. 1; pp. 15–22.*

B. Wagner, M. Kreutzer, W. Benecke; Electromagnetic Microactuators with Multiple Degrees of Freedom; © 1991; Fraunhofer–Institut Fur Mikrostrukturtechnik Dillenburger Str. 53, D–1000 Berlin 33, FRG; pp. 614–617.*

E. Fullin et al., "A New Basic Technology For Magnetic Micro–Actuators", MEMS 98, Proceedings IEEE of the 11th Annual International Workshop on Micro Electro Mechanical Systems. An Investigation of Micro Structures, sensors, Actuators, Machines and Systems. Heidelberg, Jan. 25–29, 1998, IEEE Workshop on Micro Electro ME, pp 143–147.

Woo Seong Che et al., "Development of Force–Balance Accelerometer With High Accuracy for Precision Motion Measurement", Measurement Science and Technology, IOP, vol. 7, No. 7, Jul. 1, 1996, pp 1001–1011.

* cited by examiner

*Primary Examiner*—Nestor Ramirez
*Assistant Examiner*—Guillermo Perez
(74) *Attorney, Agent, or Firm*—Burns, Doane, Swecker & Mathis, LLP

(57) ABSTRACT

A comb structure in which a magnetic force, which is generated between a pair of intermeshed combs by applying a magnetic flux thereto, is constant with respect to the relative motion between the combs, is provided. Also, an actuator and an inertia sensor both using the comb structure are provided. The comb structure includes a pair of magnetic combs, a magnetic flux guide for magnetically connecting the pair of combs, a coil wound around an arbitrary portion of the magnetic flux guide, and a power supply connected to the coil. The pair of magnetic combs intermeshed with each other having a gap S therebetween are connected to each other by the magnetic flux guide, such that they are driven by receiving a magnetic field from the coil. The coil is supposed to generate a magnetic field under the influence of a current provided from the power supply.

14 Claims, 7 Drawing Sheets

COMB STRUCTURE USING MAGNETIC FORCE AND ACTUATOR AND INERTIA SENSOR BOTH USING THE COMB STRUCTURE

BACKGROUND OF THE INVENTION

1. Field of the Invention

The present invention relates to a comb structure using a magnetic force, an actuator and an inertia sensor which use the comb structure, and more particularly, to a comb structure in which a magnetic force, which is generated between a pair of interlocked combs by applying a magnetic flux thereto, is constant with respect to the relative motion between the combs, and to an actuator and an inertia sensor both using the comb structure.

2. Description of the Related Art

In many cases, electrostatic actuators and magnetic actuators are used to move micro structures. An electrostatic comb drive (U.S. Pat. No. 5,025,346) is well known as an electrostatic actuator. The basic principle of the electrostatic comb drive will now be described with reference to FIG. 1.

A pair of combs 1 and 2 mesh with each other with a gap S between fingers thereof. When a power supply voltage 3 is connected to each of the combs 1 and 2 via conductive wires 4 and 5, respectively, a horizontal electrostatic force 6 acting upon a finger of the comb 2 is expressed by the following Equation 1:

$$F_S = \varepsilon_0 \frac{t}{s} V^2 \tag{1}$$

wherein $\varepsilon_0$, t, s and V denote the permittivity of free space, the thickness of a finger, the interval between the finger of the comb 2 and an adjacent finger of the comb 1, and a voltage 3 applied to a bridge between fingers, respectively. The electrostatic comb driver can be manufactured by a CMOS process such as a process for manufacturing a semiconductor RAM, and has a constant force with respect to the motion of a comb as shown in Equation 1. However, the force is too weak to directly drive large structures.

As an example of a magnetic actuator, an actuator is introduced by E. Fullin et al. ["A New Basic Technology for Magnetic Micro Actuators", Proceedings of IEEE Micro Electro Mechanical Systems, pp 143–147, 1998]. The magnetic actuator is conceptually shown in FIG. 2. In this magnetic actuator, a pair of magnetic plates 11 and 12 face each other having an interval h therebetween, and each is connected to a magnetic flux guide 13. A coil 14 is wound around a portion of the magnetic flux guide 13. The coil 14 is connected to the power supply voltage 15, such that it generates an electromotive force when a current flows through the coil 14, thereby forming a magnetic circuit which connects to the magnetic flux guide, the two plates 11 and 12 and the gap h. In this case, most of the magnetic resistance in the circuit is in the gap h, so that a magnetic force 16 acting upon the plate 12 can be expressed by the following Equation 2:

$$F_s = \frac{\mu_0}{2} \frac{A}{h^2} (NI)^2 \tag{2}$$

wherein $\mu_0$, A, h and NI denote the permeability of free space, the area of each of the plates 11 and 12, the interval between the plates 11 and 12, and an electromotive force depending on the number of windings of the coil 4 and the flow of current, respectively. Referring to Equation 2, the magnetic force in an existing structure is inversely proportional to the square of the interval between the two plates, h. Thus, there are problems in that it is difficult to control the position of the existing structure, and the upper plate becomes attached to the lower plate.

SUMMARY OF THE INVENTION

To solve the above problems, an objective of the present invention is to provide a comb structure using a magnetic force, by which a strong force can be provided to drive a large structure, and the position of a structure can be easily controlled, and an actuator and an inertia sensor both using the comb structure.

Accordingly, to achieve the above objective, there is provided a comb structure using a magnetic force, including a board, a suspension structure, at least one supporter, at least one elastic member, a movable comb, a fixed comb, and at least one magnetic flux guide. The suspension structure, which is an inertia body, is separated a predetermined height from the board while maintaining the predetermined height from the board. The at least one supporter supports the suspension structure so that the suspension structure is spaced from the upper surface of the board. The at least one elastic member connects the suspension structure to the supporter and supporting them so that the suspension structure makes an inertial movement over the substrate. The movable comb has at least one finger, is attached to the suspension structure, and maintains a predetermined interval from the substrate. The fixed comb is fixed onto the board such that the fixed comb is opposite to the movable comb, intermeshing with the movable comb. The at least one magnetic flux guide induces a magnetic flux between the fixed comb and the suspension structure. A magnetic circuit comprised of a combination of the fixed comb, the suspension structure and the magnetic flux guide, is formed. When a magnetomotive force is applied to the magnetic circuit, a magnetic flux flows between the movable comb and the fixed comb to generate a magnetic force, and the suspension structure is formed so that it is excited.

In the present invention, a coil is wound around a portion of the magnetic circuit, and a power supply is supplied to the coil, thus generating the magnetomotive force. Alternatively, a magnet is installed on a portion of the magnetic circuit, thus generating the magnetomotive force. Preferably, the magnetic flux guide is connected to the supporter and a supporting unit for the fixed comb to form a magnetic flux guide on the movable comb and the fixed comb. Also, it is preferable that a moving unit comprised of the suspension structure, the movable comb and the elastic member is formed to install a magnetic flux guide on the movable comb and the fixed comb, and that the magnetic flux guide extends from a location that is separated from the moving unit by a predetermined distance, to the supporting unit for the fixed comb.

Also, preferably, in the suspension structure, the movable comb and the supporter are incorporated in a body such that the incorporated body moves horizontally with respect to the board, or the movable comb and the supporter are incorporated in a body such that the incorporated body rotates with respect to the support. It is preferable that a moving unit comprised of the suspension structure, the movable comb and the elastic member is formed to install a magnetic flux guide on the movable comb and the fixed comb, and that the magnetic flux guide is driven by the resonance frequency of the moving unit.

To achieve the above objective of the present invention, there is provided an actuator including a board, a suspension structure, at least one elastic member, a movable comb, a fixed comb, at least one magnetic flux guide, a coil, and a power supply. The suspension structure, which is an inertia body, is separated a predetermined height from the board, maintaining the predetermined interval with the board. The at least one supporter supports the suspension structure so that the suspension structure is spaced from the upper surface of the board. The at least one elastic member connects the suspension structure to the supporter and supporting them so that the suspension structure makes an inertial movement over the substrate. The movable comb has at least one finger, is attached to the suspension structure, and keeps a predetermined interval from the substrate. The fixed comb is fixed onto the board so that a predetermined interval is maintained between the fixed comb and the movable comb, the fixed comb being meshed with the movable comb opposite thereto. The at least one magnetic flux guide flows a magnetic flux between the fixed comb and the suspension structure. The coil winds around a predetermined portion of the magnetic flux guide. The power supply flows a current in the coil to generate a magnetomotive force. A magnetic circuit comprised of a combination of the fixed comb, the suspension structure and the magnetic flux guide, is formed. When a magnetomotive force generated by flowing a current in the coil is applied to the magnetic circuit, a magnetic flux flows between the movable comb and the fixed comb to generate a magnetic force, and the suspension structure is formed so that it is excited.

To achieve the above objective of the present invention, there is provided an inertial sensor using a comb structure using a magnetic force, the inertial sensor including a board, a suspension structure, at least one support, at least one elastic member, a movable comb, a fixed comb, at least one magnetic flux guide, and a magnetomotive force. The suspension structure, which is an inertia body, is separated a predetermined height from the board, maintaining the predetermined interval with the board. The at least one supporter supports the suspension structure so that the suspension structure is spaced upward from the board. The at least one elastic member connects the suspension structure to the supporter and supporting them so that the suspension structure makes an inertial movement over the substrate. The movable comb has at least one finger, is attached to the suspension structure, and keeps a predetermined interval from the substrate. The fixed comb is fixed onto the board so that a predetermined interval is maintained between the fixed comb and the movable comb, the fixed comb being meshed with the movable comb opposite thereto. The at least one magnetic flux guide induces a magnetic flux between the fixed comb and the suspension structure. The magnetomotive force generator induces a current in the magnetic flux guide. A magnetic circuit comprised of a combination of the fixed comb, the suspension structure and the magnetic flux guide is formed, and a variation in inertia depending on the motion of the suspension structure (i.e, a variation in distance between the fixed comb and the movable comb) can be detected by comprising a magnetic flux sensor for sensing a magnetic flux which flows in the magnetic flux guide.

In the present invention, the magnetomotive generator includes a coil wound around a predetermined portion of the magnetic flux guide; and a power supply for inducing a current in the coil to generate a magnetomotive force. Alternatively, the magnetomotive generator is a permanent magnet installed on a predetermined portion of the magnetic flux guide. Preferably, the magnetic flux sensor is a coil wound around a predetermined portion of the magnetic circuit.

BRIEF DESCRIPTION OF THE DRAWINGS

The above objective and advantages of the present invention will become more apparent by describing in detail preferred embodiments thereof with reference to the attached drawings in which.

DESCRIPTION OF THE PREFERRED EMBODIMENTS

Figure 3:
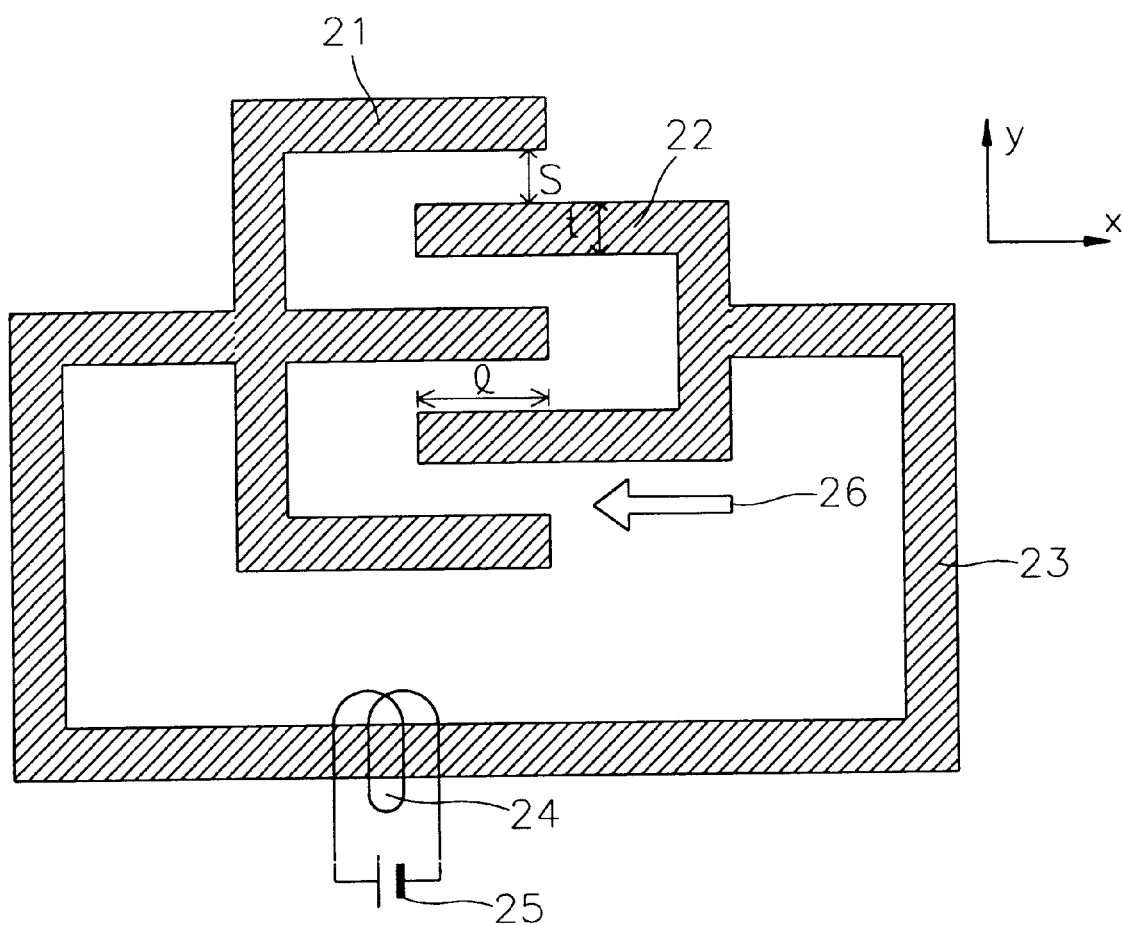
FIG. 3 is a plan view illustrating the schematic configuration of a comb structure according to the present invention.

Referring to FIG. 3, a comb structure using a magnetic force according to the present invention includes a pair of magnetic combs 21 and 22, a magnetic flux guide 23 for magnetically connecting the pair of combs 21 and 22 to each other, a coil 24 wound around an arbitrary portion of the magnetic flux guide 23, and a power supply 25 connected to the coil 24. The pair of magnetic combs 21 and 22 are meshed with each other with a gap s between fingers thereof. Since the pair of combs 21 and 22 are connected to each other via the magnetic flux guide 23, they are driven by receiving a magnetic field which is produced in the coil 24. In the coil, a magnetic field is generated by a current provided from the power supply 25.

This comb structure using a magnetic force is hundreds of times stronger than a comb driver using an electrostatic force, and can apply a constant force with respect to a change in the distance between two plates. The operational principle of this comb structure will now be described.

As shown in FIG. 3, when a current from the power supply 25 is applied to the coil 24, an electromotive force is generated in the coil 24, and a magnetic flux 26 flows along the magnetic flux guide 23 under the influence of the electromotive force. The magnetic flux 26 flows in sequence of the magnetic flux guide 23, the left side comb 21, the gap S, the right side comb 22, and the magnetic flux guide 23. In this case, most of the magnetic resistance is generated in the gap S, so that when the right comb 22 has n fingers, a magnetic resistance R in the gap S between adjacent fingers can be expressed by the following Equation 3:

$$R = \frac{1}{2}\frac{s}{\mu_0 lt} \quad (3)$$

wherein $\mu_0$, s, I and t denote the permeability of free space, the gap, the length by which the combs 21 and 22 overlap, and the thickness of the finger of a comb, respectively. Therefore, a magnetic flux flowing in a finger of the comb 22 which is moving is expressed by the following Equation 4:

$$\Phi = \frac{NI}{R} = 2NI\frac{\mu_0 tl}{s} \quad (4)$$

A magnetic flux density B, which a measure of the amount of magnetic flux flow per unit area, can be expressed by the following Equation 5:

$$B = \frac{\Phi}{A} = \frac{\Phi}{2tl} = NI\frac{\mu_0}{s} \quad (5)$$

Energy E stored in a pair of gaps s can be expressed by the following Equation 6:

$$E = \frac{1}{2}\int \overline{B}\cdot \overline{H}dv = \frac{1}{2}\frac{B^2}{\mu_0}2tls \quad (6)$$
$$= \mu_0 \frac{t}{s}l(NI)^2$$

Thus, a force $F_m$ which acts upon a finger of the comb 22 can be obtained by integrating the energy E with respect to 1, as shown in the following Equation 7:

$$F_m = \frac{\partial E}{\partial l} = \mu_0 \frac{t}{s}(NI)^2 \quad (7)$$

The result of Equation 7 is a force acting upon one finger, so that when the movable comb 22 has n fingers, a force $F_n$ is expressed by the following Equation 8:

$$F_n = nF_m = n\mu_0 \frac{t}{s}(NI)^2 \quad (8)$$

Referring to Equation 8 which calculates a magnetic force between two combs 21 and 22 with reference to FIG. 3 showing a basic concept view of a comb structure using a magnetic force, the magnetic force $F_n$ is independent of motion in the horizontal direction (direction indicated by arrow x). Hence, given an electromotive force NI, it can be seen that the electromotive force is constant even when the distance between horizontal comb fingers varies.

Figure 1:
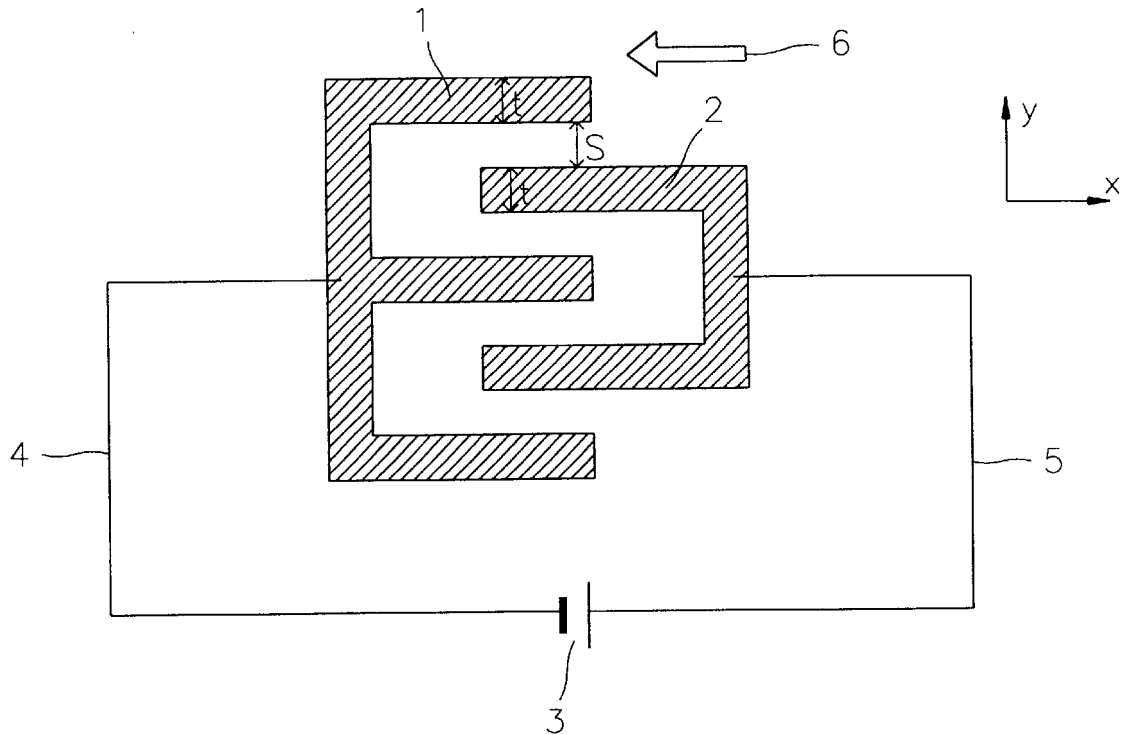
FIG. 1 is a plan view illustrating the schematic configuration of a conventional comb structure using an electrostatic force.
Figure 2:
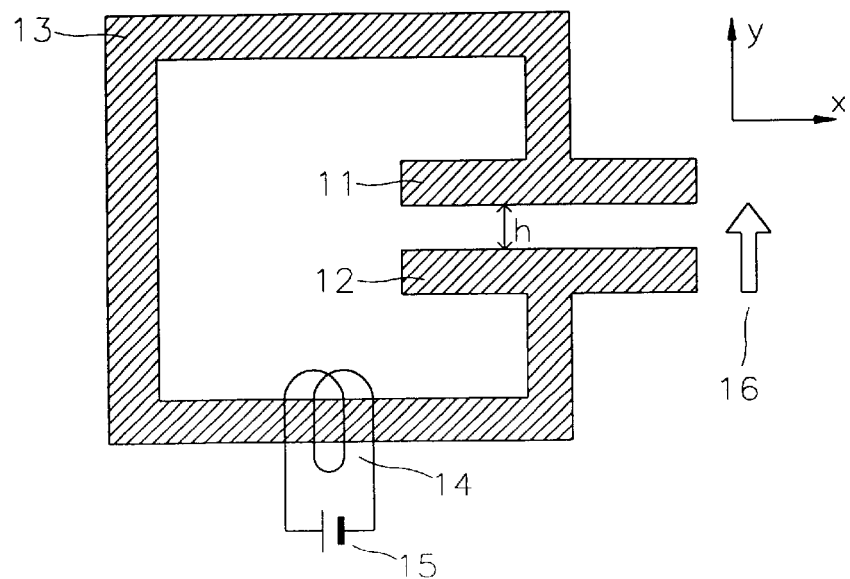
FIG. 2 is a plan view illustrating the schematic configuration of a conventional structure using a magnetic force.

In order to compare the force of a comb finger due to the existing electrostatic force shown in FIG. 1, with that of a comb finger due to the magnetic force of the structure shown in FIG. 3, Equation 1 is divided by Equation 7. Whereby, under the conditions of t, s, or the number of fingers applied to the case of the existing electrostatic comb, the following Equation 9 can be obtained:

$$\frac{F_s}{F_m} = \frac{\mu_0}{\varepsilon_0}\left(\frac{NI}{V}\right)^2 \quad (9)$$

wherein $\varepsilon_0$ is $8.854\times 10^{-12}$ F/m; $\mu_0$ is $4\pi\times 10^{-7}$ H/m; V, a voltage in a structure using common static electricity, is usually 50V; N, the number of turns of a coil in a structure using a magnetic force, is 40; and I, a current provided to the coil, is 0.1 A. Accordingly, the ratio of the force of an existing electrostatic comb to that of a magnetic comb according to the present invention is calculated by a common micro device, as shown in the following Equation 10:

$$\frac{F_s}{F_m} = \frac{4\pi\times 10^{-7}}{8.854\times 10^{-12}}\left(\frac{40\times 0.1}{50}\right) \quad (10)$$
$$= 896$$

That is, when the size of the magnetic comb is the same as that of the electrostatic comb, the magnetic comb can generate a force that is 896 times stronger than that of the electrostatic comb, under normal conditions. Hence, the magnetic comb can be used for several purposes such as driving of exciting structures which requires a great force. Also, the magnetic comb generates a force by inducing a current, and can operate at a lower voltage than a voltage at which the electrostatic comb operates.

Figure 4:
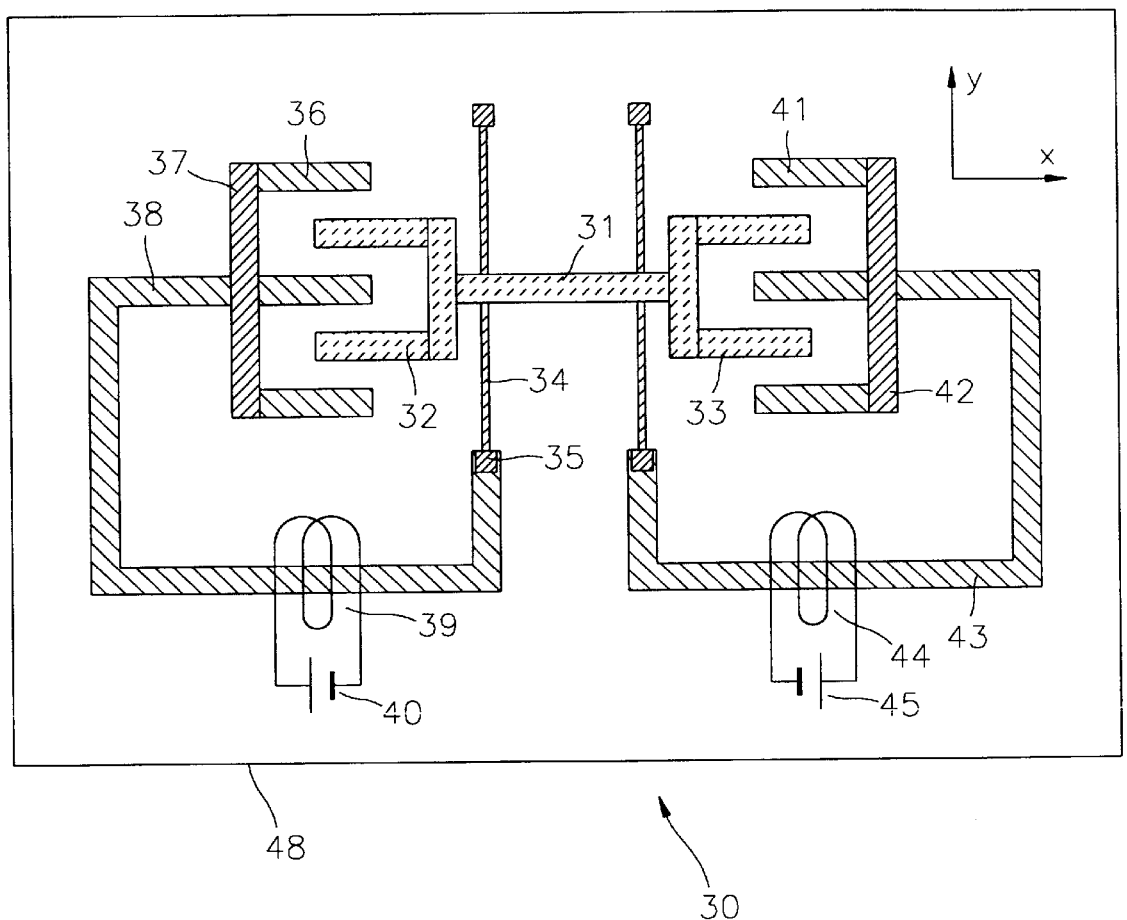
FIG. 4 is a plan view of an embodiment of a straight-forwarding driver using the comb structure of FIG. 3.

An embodiment of a comb structure using a magnetic force having such a configuration will now be described in detail. Referring to FIG. 4 showing a plan view of an embodiment of an exciting driver using the comb structure of FIG. 3, a suspension structure (mass body) 31 in a rectilinear moving structure 30 has a plurality of movable combs 32 and 33, and is fixed to a support board 48 by a plurality of supporters 34 and a plurality of fixing units 35. The suspension structure (mass body) 31, the movable combs 32 and 33, and the supporters 34 are spaced apart from the support board 48 by predetermined intervals. Fixed combs 36 and 41 which are meshed with the movable combs 32 and 33 and isolated from each other by a predetermined distance, are attached to the support substrate 48 by fixed comb supporting units 37 and 42. Magnetic flux guides 38 and 43 connect the fixed comb supporting units 37 and 42 to the supporters 34, respectively, such that a magnetic flux flows between the movable comb 32 and the fixed comb 36 and between the movable comb 33 and the fixed comb 41. Coils 39 and 44 are wound around arbitrary portions of the magnetic flux guides 38 and 43, respectively, and a magnetomotive force is obtained by connecting power supplies 40 and 45 to the coils 39 and 44, respectively.

In this comb structure, a right comb and a left comb are driven by the same principle. Thus, only the principle of driving the left comb will now be described as an example.

A magnetomotive force is generated when a current flows in the coil 39 by the operation of the power supply 40, and a magnetic flux flows from a portion of the magnetic flux guide 38 on which the coil 39 is installed, to the supporter 34 via the fixing unit 35, and passes through the suspension structure (mass body) 31. The magnetic flux which has passed through the suspension structure (mass body) 31 flows back to the magnetic flux guide 38 via the left movable comb 32, the fixed comb 36, and the fixed comb supporting unit 37. Thus, the magnetic flux of a closed circuit is formed depending on the intensity of a current applied to the coil, which varies a force acting in the horizontal direction (direction indicated by arrow x of FIG. 4), between the movable comb 32 and the fixed comb 36. The magnetic force is constant even when the suspension structure (mass body) 31 moves horizontally depending on a formula obtained from Equation 9, thus enabling the suspension structure (mass body) 31 to move stably. The plurality of supporters 34 separate the suspension structure (mass body) 31 and the plurality of combs 32 and 33 from the board 48 by a given interval, and also act as springs to thus vibrate the suspension structure (mass body) 31.

In the embodiment of FIG. 4 described above, the coils 39 and 44 are installed in the middle of the magnetic flux guides 38 and 43 to provide a magnetomotive force. However, instead of using the coils, a magnetomotive force can be provided by traversing a permanent magnet across that portion where the coils are installed. Also, the suspension structure (mass body) 31 can be driven at the resonance point of the comb structure using a generated magnetic force. Such a comb structure can be adopted and used in various actuators and sensors.

An optical modulator can be taken as an example of an actuator adopting the comb structure using the magnetic force. The optical modulator can be used to modulate arbitrary information onto light, or as a scanner for controlling a light path, by attaching a mirror (not shown in FIG. 4) to the structure 31 in the structure 30 and then applying light to the mirror and moving (exciting) the structure 31 using a magnetic force.

An acceleration sensor is an example of a sensor adopting the comb structure using the magnetic force. The suspension structure (mass body) 31 in the vibrating structure of FIG. 4 is separated from the board 48 by a predetermined interval, such that it can move in the horizontal direction (the direction indicated by the arrow x of FIG. 4) with respect to the board 48. At this time, when acceleration in the horizontal direction indicated by the arrow x of FIG. 4 is applied, a magnetic flux flowing in the magnetic flux guide 38 varies. Thus, the acceleration can be detected by sensing the varying magnetic flux using a different coil (not shown in FIG. 4) wound around a portion of the magnetic flux guide.

The comb structure using the magnetic force can also be adopted by a variety of actuators for moving a suspension structure (mass body), and by various inertia sensors and magnetic flux sensors.

Figure 5:
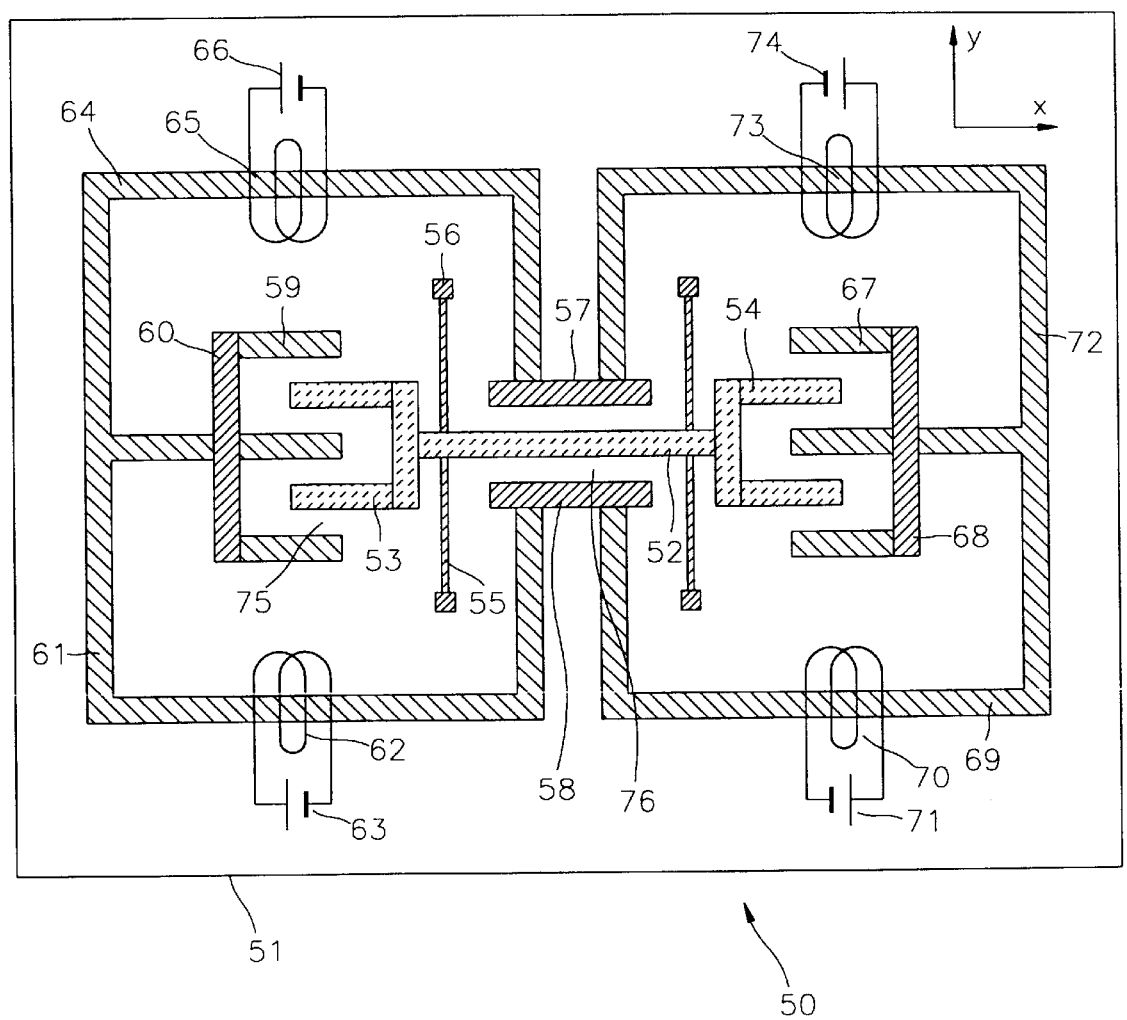
FIG. 5 is a plan view of another embodiment of a straight-forwarding driver using the comb structure of FIG. 3.

FIG. 5 shows a rectilinear motion driver 50 taken as a still another embodiment of a comb structure according to the present invention. In this embodiment, a disadvantage of the embodiment of FIG. 4 in that a magnetic flux is easily saturated while flowing along the supporters 34, is solved. Generally, the supporters 34 installed in the embodiment of FIG. 4 have a small cross-sectional area since they must have an appropriate spring coefficient. In this case, the magnetic flux density of the supporters 34 theoretically must increase as a great amount of magnetic flux flows in the supporters 34. However, in practice, the magnetic flux is so easily saturated that a great amount of magnetic flux cannot flow. Accordingly, the embodiment of FIG. 5 is developed to solve such a disadvantage.

In the embodiment of FIG. 5, a suspension structure (mass body) 52 has a plurality of movable combs 53 and 54, and is supported on a board 51 by a plurality of fixing units 56 and separated a predetermined distance therefrom by a plurality of supporters 55. Fixed combs 59 and 67, which maintain a predetermined interval from the movable combs 53 and 54, are supported by supporting units 60 and 68, opposite to the movable combs 53 and 54. Magnetic flux guides 61, 64, 69 and 72 are connected from fixed comb supporting units 60 and 68 to a plurality of magnetic flux guide supporting units 57 and 58 fixed to the board 51. The magnetic flux guide supporting units 57 and 58 are fixed to the board 51, and maintain a proper gap 76 with the suspension structure (mass body) 52. The magnetic flux guide supporting units 57 and 58 are installed such that a magnetic flux passes through the gap 76 by forming a closed magnetic circuit while the suspension structure (mass body) 52 freely moves. A plurality of coils 62, 65, 70 and 73 are wound around four arbitrary portions of the magnetic flux guides 61, 64, 69 and 72, and can generate magnetomotive forces by being connected to power supplies 63, 66, 71 and 74, respectively.

The operating principle of the comb structure shown in FIG. 5 is almost the same as that of the embodiment of FIG. 4 except that a magnetic flux passes through the gap 76. In the comb structure, two pairs of combs on upper, lower, left and right sides are driven by an identical principle, so the driving principle of a magnetic circuit on the lower left side will now be described as an example.

First, when a current flows in the coil 62 by the operation of the power supply 63, a magnetomotive force is generated. A magnetic flux flows in the magnetic flux guide 61 under the influence of the magnetomotive force, and passes through the magnetic flux guide supporting unit 58, the gap 76, the mass body 52, the left comb 53, the gap 75 between the fixed comb 59 and the movable comb 53, the fixed comb 59, and the fixed comb supporting unit 60, and flows back to the magnetic flux guide 61, thereby forming a close magnetic circuit. Hence, the force which acts upon the movable comb 53 can be controlled by adjusting the current flowing in the coil 62. The magnetic flux guide supporting unit 58 is large enough to prevent the magnetic flux density from being saturated in the entire magnetic circuit. This structure can also be adopted by actuators for actuating various structures such as the comb structure shown in FIG. 4, and by various sensors.

Figure 6:
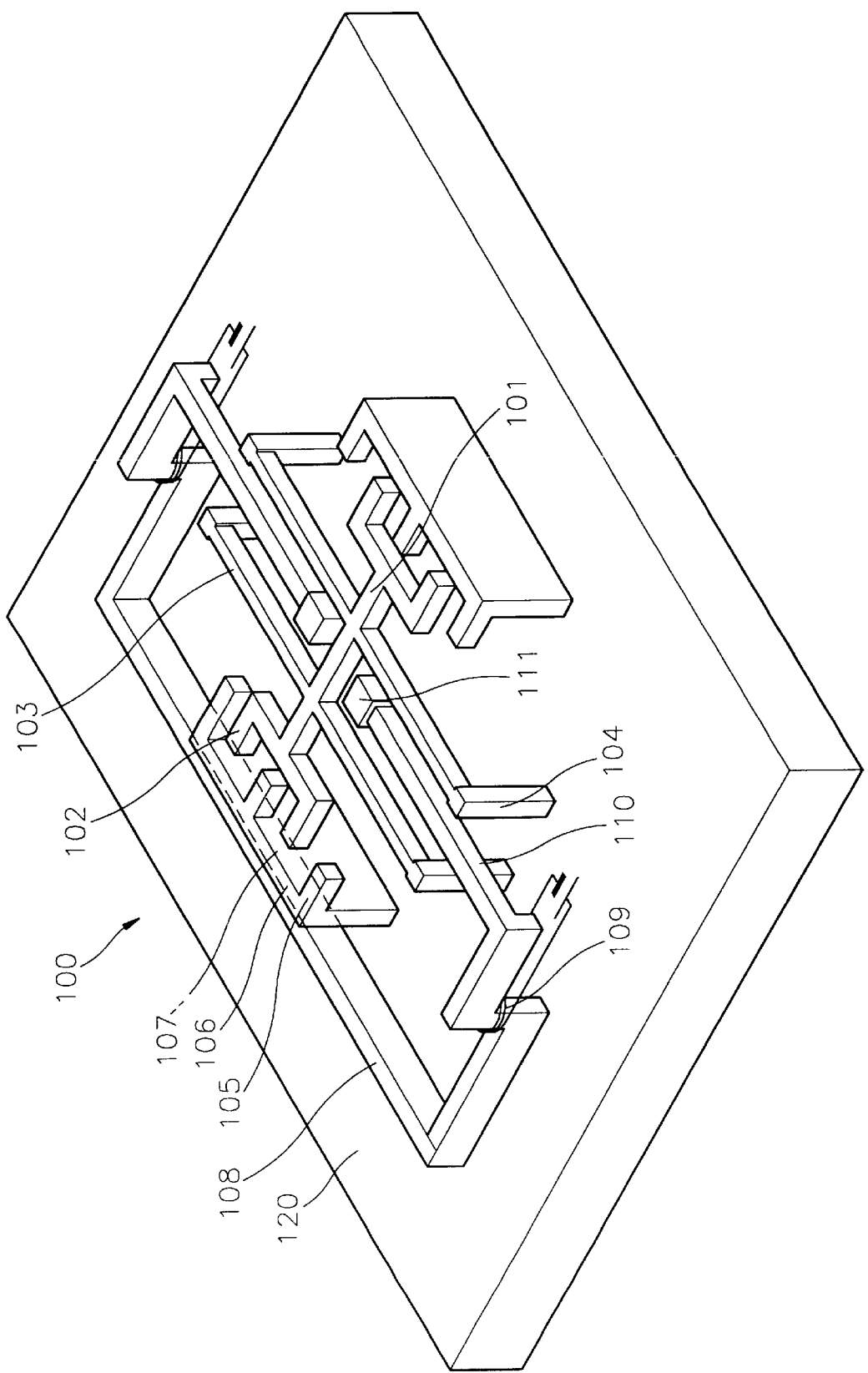
FIG. 6 is a three-dimensional perspective view of the embodiment of FIG. 5.

FIG. 6 shows an embodiment of the exciting structure of FIG. 5 in three-dimensions to facilitate a sufficient understanding thereof. In FIG. 6, an entire structure 100 is two-dimensionally embodied on a board 120.

This structure can be easily embodied by a method of fabricating the head of a hard disk drive (HDD). A suspension structure (mass body) 101 has a plurality of movable combs 102, and is supported by the upper surface of a board 120 while being spaced an appropriate interval from the board 120 by a plurality of supporters 103 and supporting units 104. A fixed comb 105, which faces the movable comb 102, is supported by the board 120 using a fixed comb supporting unit 106. The fixed comb supporting unit 106 is connected to a plurality of magnetic flux guide supporting units 111 which maintain predetermined intervals with the suspension structure (mass body) 101, by a plurality of magnetic flux guides 107, 108 and 110. A plurality of coils 109 are wound around the contacting portions between the magnetic flux guides 108 and 110. The operational principle of the comb structure having such a configuration is the same as that of the embodiment of FIG. 5. This comb structure can be manufactured by a surface micro machining method to which the HDD head fabricating method is applied. The comb structure and the magnetic flux guides are made of a magnetic material such as NiFe, and the coils are made of a conductive material such as copper. For convenience sake, FIG. 6 does not show a protective layer for protecting conductors for electrical connection or conductive materials such as copper.

Figure 7:
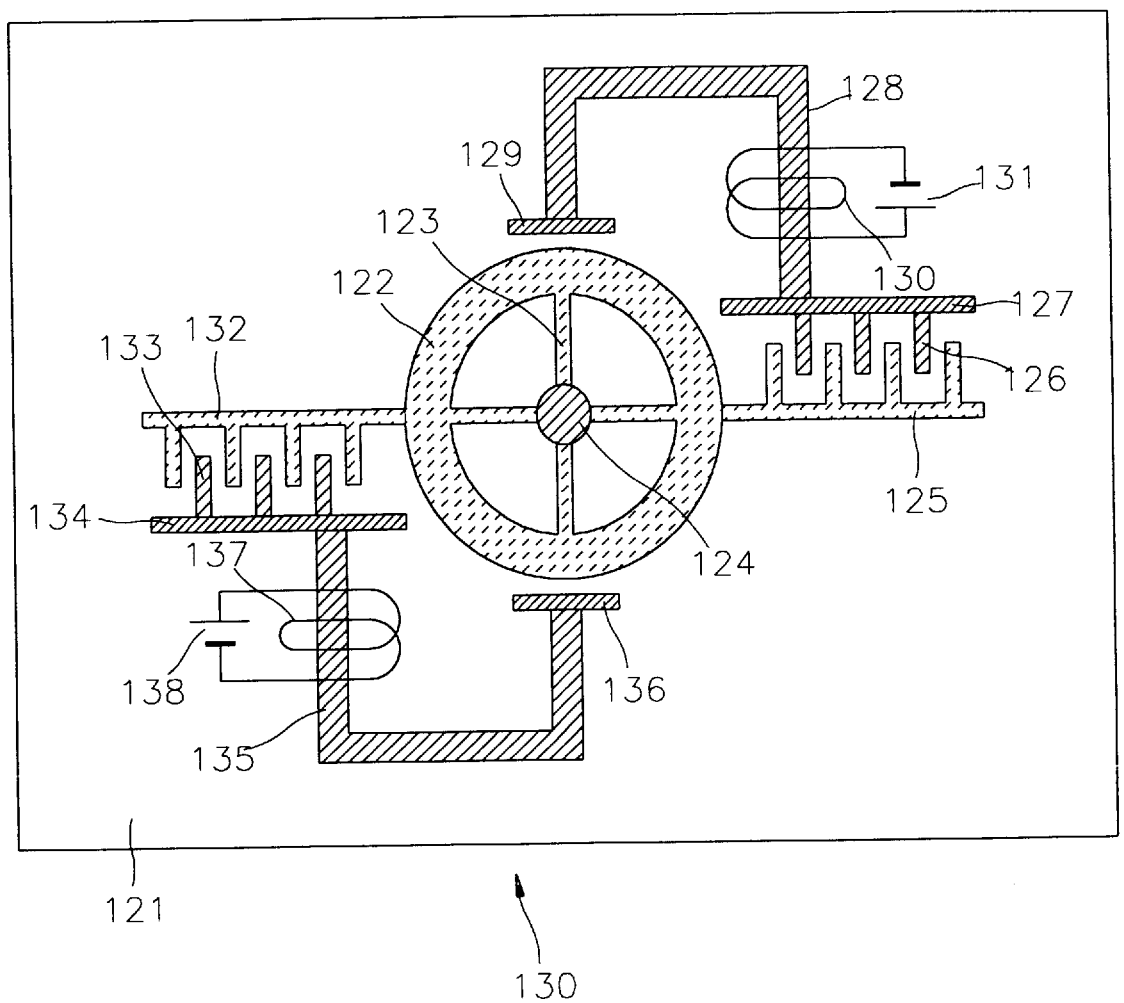
FIG. 7 is a plan view schematically illustrating an embodiment of a rotary driving structure according to the present invention.
Figure 8:
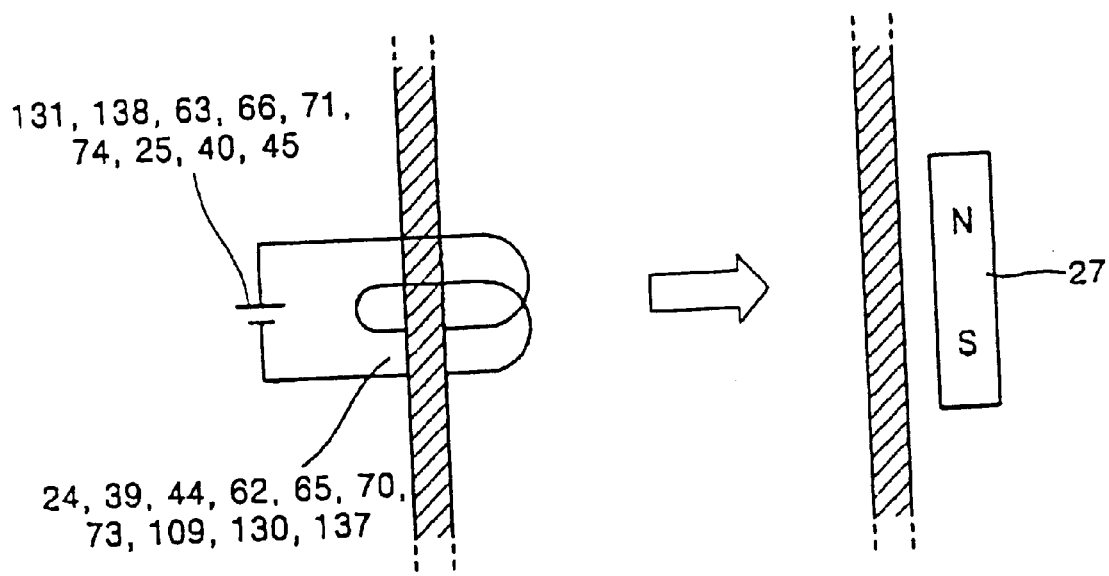
FIG. 8 illustrates that the coils of the various embodiments can be replaced with a permanent magnet.

FIG. 7 shows another embodiment of a comb structure using a magnetic force according to the present invention. This embodiment corresponds to a structure which can apply a force to a ring-shaped structure. In FIG. 7, a ring-shaped suspension structure (mass body) 122 has a plurality of movable combs 125 and 132, and is supported by a board 121 using a plurality of supporters 123 while being separated a predetermined interval from the board 121 by a supporting unit 124. A plurality of fixed combs 126 and 133 are intermeshed with the movable combs 125 and 132, respectively, having predetermined intervals therebetween. The fixed combs 126 and 133 are supported by the fixed comb supporting units 127 and 134. Magnetic flux guides 128 and 135 are connected between the fixed comb supporting units 127 and 134 and magnetic flux guide supporting units 129 and 136. The driving principle of this comb structure is similar to that of the above-described structure. A magnetic circuit on the upper right side in the structure of FIG. 7 will now be described as an example.

When a current flows in a coil 130 by the operation of a power supply 131, a magnetomotive force is generated. A magnetic circuit is formed in which a magnetic flux flows in the sequence of the magnetic flux guide 128, the fixed comb supporting unit 127, the fixed comb 126, the movable comb 125, the suspension structure (mass body) 122 or inertia body 122, and the magnetic flux guide supporting unit 129. According to the driving principle of the comb structure of FIG. 3, the suspension structure (mass body) 122 is rotated about the supporting unit 124 by applying a force to the movable comb 125. The degree of the rotation angle can be controlled by the intensity of a current which is applied to the coil. The structure of FIG. 7 can be adopted by various actuators and sensors in the same principle as described in the latter part of the description of the structure of FIG. 4.

In the above embodiments, the case in which the gap between a movable comb and a fixed comb is constant has been described as an example. However, in order to obtain performance improvement such as uniformity of the intensity of a force depending on the motion of the movable comb, the gap between the movable comb and the fixed comb can be varied by changing the width of the movable comb or a fixed electrode. Also, in the above embodiments, coils are wound around predetermined portions of a magnetic flux guide to generate a magnetomotive force. However, the magnetomotive force can be generated by winding coils around arbitrary portions of a magnetic circuit including movable combs, fixed combs, and a magnetic flux guide, or by positioning a magnet on the same portions, thereby generating a magnetic force.

As described above, a comb structure using a magnetic force according to the present invention includes a pair of magnetic combs, a magnetic flux guide for magnetically connecting the pair of combs, a coil wound around an arbitrary portion of the magnetic flux guide, and a power supply connected to the coil. The pair of magnetic combs interlocked with each other having a gap S therebetween are connected to each other by the magnetic flux guide 23, such that they are driven by receiving a magnetic field from the coil. The coil generates a magnetic field under the influence of a current provided from the power supply. Accordingly, an actuator and a sensor both using this comb structure can obtain the following effects.

First, the actuator and sensor using magnetic combs according to the present invention can obtain a force that is hundreds of times stronger than the actuator and sensor having existing electrostatic combs that have the same sizes as the magnetic combs.

Second, the suspension structure (mass body) of an existing magnetic actuator receives a force that is inversely proportional to the square of the moving distance of the moving comb, that is, the force is extremely non-linear, whereas the suspension structure (mass body) of the actuator according to the present invention receives a force that is constant with respect to the distance of movement of a suspension structure (mass body). Thus, position control and force control are easy.

Third, the actuator according to the present invention has such a strong force that it can drive a structure at an arbitrary frequency without need to drive the same at a resonance point. Therefore, when a sensor using resonance such as a microgyroscope is manufactured using the structure according to the present invention, it is not necessary to equalize the exciting-directive resonance frequency of the structure to the sensing-directive resonance frequency thereof.

Fourth, the structure according to the present invention can be manufactured by the method of fabricating the head of a hard disk drive (HDD), thus enabling integration of an actuator and a head. That is, it is easy to incorporate a magnetic head and an actuator in one body.

What is claimed is:

1. A comb structure comprising:
   a board;
   a suspension structure, which is an inertia body, separated a height from the board;
   at least one supporter for supporting the suspension structure so that the suspension structure is spaced from the upper surface of the board;
   at least one elastic member for connecting the suspension structure to the supporter and supporting the suspension structure so that the suspension structure makes an inertial movement over the board;
   a movable comb, which has at least two fingers, attached to the suspension structure, and maintains an interval from the board;
   a fixed comb which is opposite to the movable comb and fixed onto the board; and
   at least one magnetic flux guide for inducing a magnetic flux between the fixed comb and the suspension structure,
   wherein a magnetic circuit comprised of a combination of the fixed comb, the suspension structure and the magnetic flux guide, is formed, and when a magnetomotive force is applied to the magnetic circuit, a magnetic flux flows between the movable comb and the fixed comb to generate a magnetic force, and the suspension structure is formed so that it is excited.

2. The comb structure of claim 1, wherein the movable comb and the fixed comb are arranged so that they are intermeshed with each other, and the gap between the movable comb and the fixed comb is constant in at least one direction even when the movable comb moves.

3. The comb structure of claim 1, wherein in the magnetic circuit, a coil is wound around a portion of the magnetic flux guide, and a power supply is supplied to the coil, thus generating the magnetomotive force.

4. The comb structure of claim 1, wherein in the magnetic circuit, a magnet is installed on a portion of the magnetic flux guide, thus generating the magnetomotive force.

5. The comb structure of claim 1, wherein the magnetic flux guide is connected to the supporter and a supporting unit for the fixed comb to form a magnetic flux guide on the movable comb and the fixed comb.

6. The comb structure of claim 1, wherein a moving unit, comprised of the suspension structure, the movable comb and the elastic member, is formed to install a magnetic flux guide on the movable comb and the fixed comb, and the magnetic flux guide extends from a location that is separated from the moving unit by a distance.

7. The comb structure of claim 1, wherein the suspension structure, the movable comb and the supporter are incorporated in a body such that the incorporated body moves horizontally with respect to the board.

8. The comb structure of claim 1, wherein the suspension structure, the movable comb and the supporter are incorporated in a body such that the incorporated body rotates with respect to the supporter.

9. The comb structure of claim 1, wherein a moving unit comprised of the suspension structure, the movable comb and the elastic member is formed to install a magnetic flux guide on the movable comb and the fixed comb, and the magnetic flux guide is driven by the resonance frequency of the moving unit.

10. An actuator comprising:

a board;

a suspension structure, which is an inertia body, separated a height from the board;

at least one supporter for supporting the suspension structure so that the suspension structure is spaced from the upper surface of the board;

at least one elastic member for connecting the suspension structure to the supporter and supporting the suspension structure so that the suspension structure makes an inertial movement over the board;

a movable comb which has at least two fingers, attached to the suspension structure, and keeps an interval from the board;

a fixed comb fixed onto the board so that an interval is maintained between the fixed comb and the movable comb in at least one direction, the fixed comb being meshed with the movable comb opposite thereto;

at least one magnetic flux guide for flowing a magnetic flux between the fixed comb and the suspension structure;

a coil wound around a portion of the magnetic flux guide; and a power supply for flowing a current in the coil to generate a magnetomotive force, wherein a magnetic circuit comprised of a combination of the fixed comb, the suspension structure and the magnetic flux guide, is formed, and when a magnetomotive force generated by flowing a current in the coil is applied to the magnetic circuit, a magnetic flux flows between the movable comb and the fixed comb to generate a magnetic force, and the suspension structure is formed so that it is excited.

11. An inertial sensor comprising:

a board;

a suspension structure, which is an inertia body, separated a height from the board, maintaining an interval with the board;

at least one supporter for supporting the suspension structure so that the suspension structure is spaced away from the board;

at least one elastic member connecting the suspension structure to the supporter and supporting the suspension structure so that the suspension structure makes an inertial movement over the board;

a movable comb which has at least two fingers, attached to the suspension structure, and keeps an interval from the board;

a fixed comb fixed onto the board so that an interval is maintained between the fixed comb and the movable comb;

at least one magnetic flux guide for inducing a magnetic flux between the fixed comb and the suspension structure; and a magnetomotive force generator for inducing a current in the magnetic flux guide, wherein a magnetic circuit comprised of a combination of the fixed comb, the suspension structure and the magnetic flux guide is formed, and a variation in inertia depending on the motion of the suspension structure can be detected by a magnetic flux sensor for sensing a magnetic flux which flows in the magnetic flux guide.

12. The inertia sensor of claim 11, wherein the magnetomotive generator comprises:

a coil wound around a predetermined portion of the magnetic flux guide; and a power supply for inducing a current in the coil to generate a magnetomotive force.

13. The inertia sensor of claim 11, wherein the magnetomotive generator is a permanent magnet installed on a predetermined portion of the magnetic flux guide.

14. The inertia sensor of claim 11, wherein the magnetic flux sensor is a coil wound around a predetermined portion of the magnetic circuit.

* * * * *